UNITED STATES PATENT OFFICE.

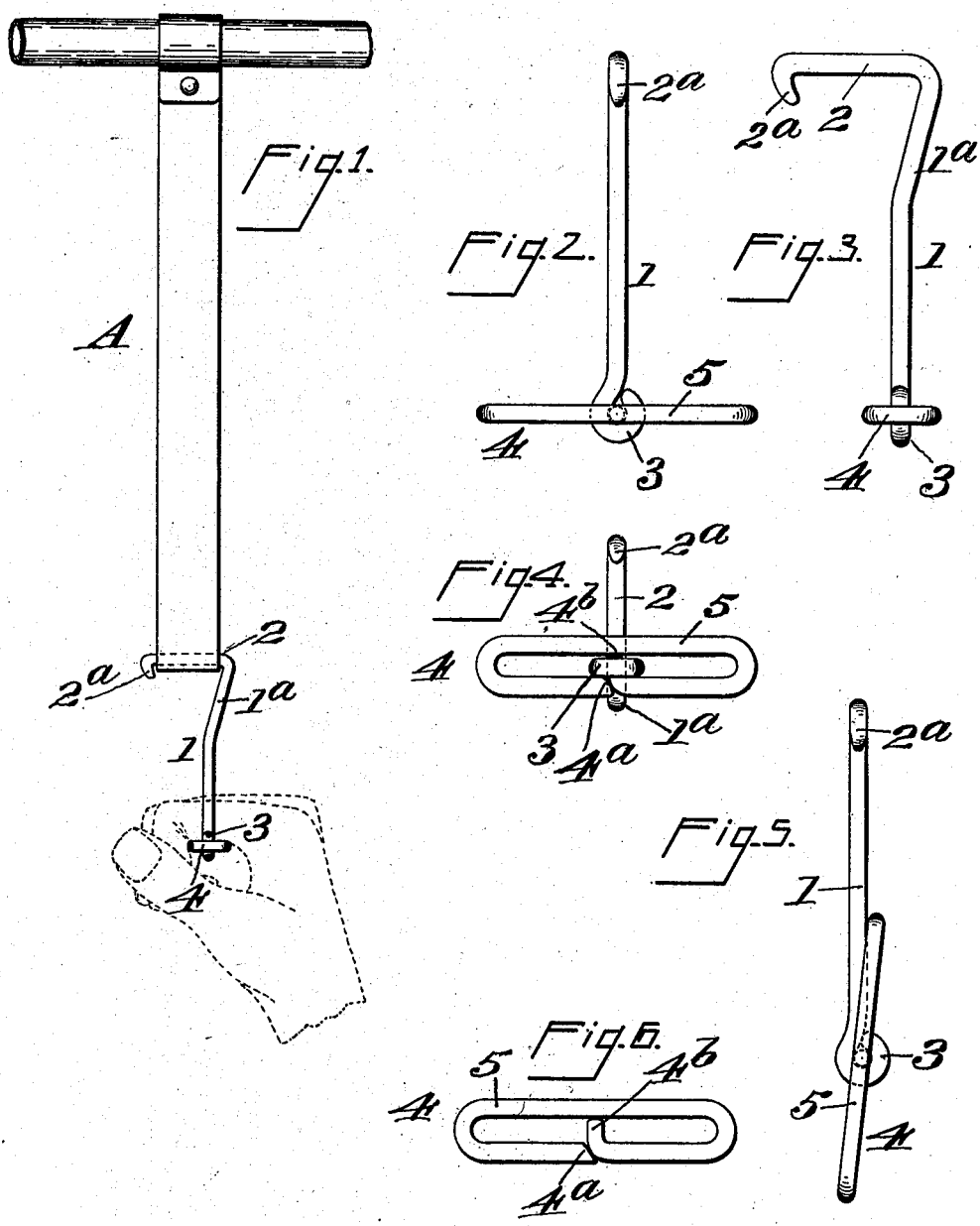

WILLIAM AUTENRIETH, OF CINCINNATI, OHIO.

GRAPPLE.

No. 901,057.  Specification of Letters Patent.  Patented Oct. 13, 1908.

Application filed December 30, 1907. Serial No. 408,627.

*To all whom it may concern:*

Be it known that I, WILLIAM AUTENRIETH, a citizen of the United States of America, and a resident of Cincinnati, in the county of Hamilton and State of Ohio, have invented certain new and useful Improvements in Grapples, of which the following is a specification.

My invention relates to improvements in grapples, or, more particularly speaking, to hand-hooks used for drawing on boots and shoes, and, also, for handling articles of merchandise and other movables and for other purposes convenient to the hand; and the object of my invention is to provide a hook having a handle pivotally connected at its hand end, such handle being adapted to be conveniently folded along the body portion or shank of the hook whereby the implement may be snugly packed for storage and shipping and, also, conveniently and comfortably carried in the pocket. I attain these objects of my invention by means of the device or implement illustrated in the accompanying sheet of drawings, in which sheet Figure 1 is a front elevation of a vertical loop or strap hanging pendent from a fragmentary portion of a horizontal bar such as is used in street-cars and other public conveyances and showing my device in use, catching into or grappling the lower end of said loop or strap, the clenched hand of the person using the grapple being shown in dotted-lines in grasping or holding position; Fig. 2, an elevation of the implement shown at a right-angle to that seen in Fig. 1, the handle being still in open or using position; Fig. 3, an elevation of the hook or grapple in the position seen in Fig. 1, but on a larger scale; Fig. 4, a bottom plan view of Fig. 2; Fig. 5, an elevation of the implement, similar to that seen in Fig. 2, but showing the handle in its folded or closed position; and Fig. 6, a plan view of the handle seen in Fig. 4, but with the hook portion of the implement omitted.

In these views, 1 indicates the body portion or shank of the grapple; 2, an outwardly-bent arm forming a hook or bill at one end of the shank; and 3, an eye formed in the shank at its opposite end, disposed at a right-angle to said hook end; $2^a$ is an inwardly-turned check or stop at the outer end of the hook-arm 2, the inner edge of such stop being curved or inclined backwardly so as to prevent undue slipping of the hook from position.

The hook end of the shank 1 is preferably flared outwardly, as best shown at $1^a$ in Figs. 1 and 3, so that the draft or pull on the hook is equalized between the opposite ends of the hook portion 2, the object being to cause a direct pull on the hook-arm 2 at or near its central portion for the better convenience and comfort of the user in handling the implement.

4 indicates a handle which is composed of a strip of stout wire, similar to that comprising the hook or grapple proper. This handle is preferably of elongated open-loop form and made of a single strip of wire bent so that its opposite ends are brought toward each other parallel to but spaced from its central body portion 5, one of such ends being beveled off at $4^a$ and the other of such ends being bent inwardly at $4^b$ so as to come in contact with said middle or body portion with the elbow of such bend resting against the bevel $4^a$, as best seen in Figs. 4 and 6.

In assembling the implement, the inwardly-bent end $4^b$ of the handle engages the eye 3 of the hook, whereby such handle is swiveled in said eye so that it can be folded against the body portion or shank 1 of the hook as best seen in Fig. 5, or arranged at a right-angle to said body portion or shank 1, as shown in the first four views, the position it occupies when in use.

It is obvious that the handle can be swung to either side of the shank 1 on the swivel-point $4^b$ and the implement is thus readily adapted to be conveniently and comfortably carried in the pocket or on the person, or snugly packed for shipment or otherwise.

In the operation of the device, especially in connection with the hanging-strap A used in street-cars and other public conveyances, the handle is swung outwardly into using position and grasped by the hand, as seen in Fig. 1, and the hook portion at the upper end of the shank engages the said hanging-strap at its lower end, the downwardly-turned stop $2^a$ preventing the hook from disengagement in the rocking or pitching movements of the advancing car. The implement thus used is well adapted to persons of short stature and obviates contact of the hand or glove with the strap, such hand or glove being otherwise subject to soiling or more or less contamination causing the spread of disease. The implement can be similarly used in connection with boot and shoe straps in drawing boots and shoes on the feet and, also, in grappling articles of merchandise and other movables in connection with which such a hook might in any way be useful.

I claim:—

1. A grapple comprising an elongated shank or body portion having an inwardly-turned hook-formation at one end and an eye-formation constructed at right-angles to said hook-formation at its opposite end and an elongated transverse handle pivotally-attached at its central portion to said eye-formation and adapted to be folded or closed lengthwise along said shank.

2. A grapple comprising a stout wire shank having a flared outer end with a hook-arm projecting laterally therefrom and an eye at its opposite end and an elongated open handle having a central inwardly-bent end, such inwardly-bent end of the handle being adapted to engage said eye for swiveling said handle on said shank, the whole forming a folding grappling-hook adapted to be carried in the pocket and conveniently thrown into position for use substantially as herein set forth.

WILLIAM AUTENRIETH.

Witnesses:
JOHN ELIAS JONES,
NORMA KEISER.